UNITED STATES PATENT OFFICE.

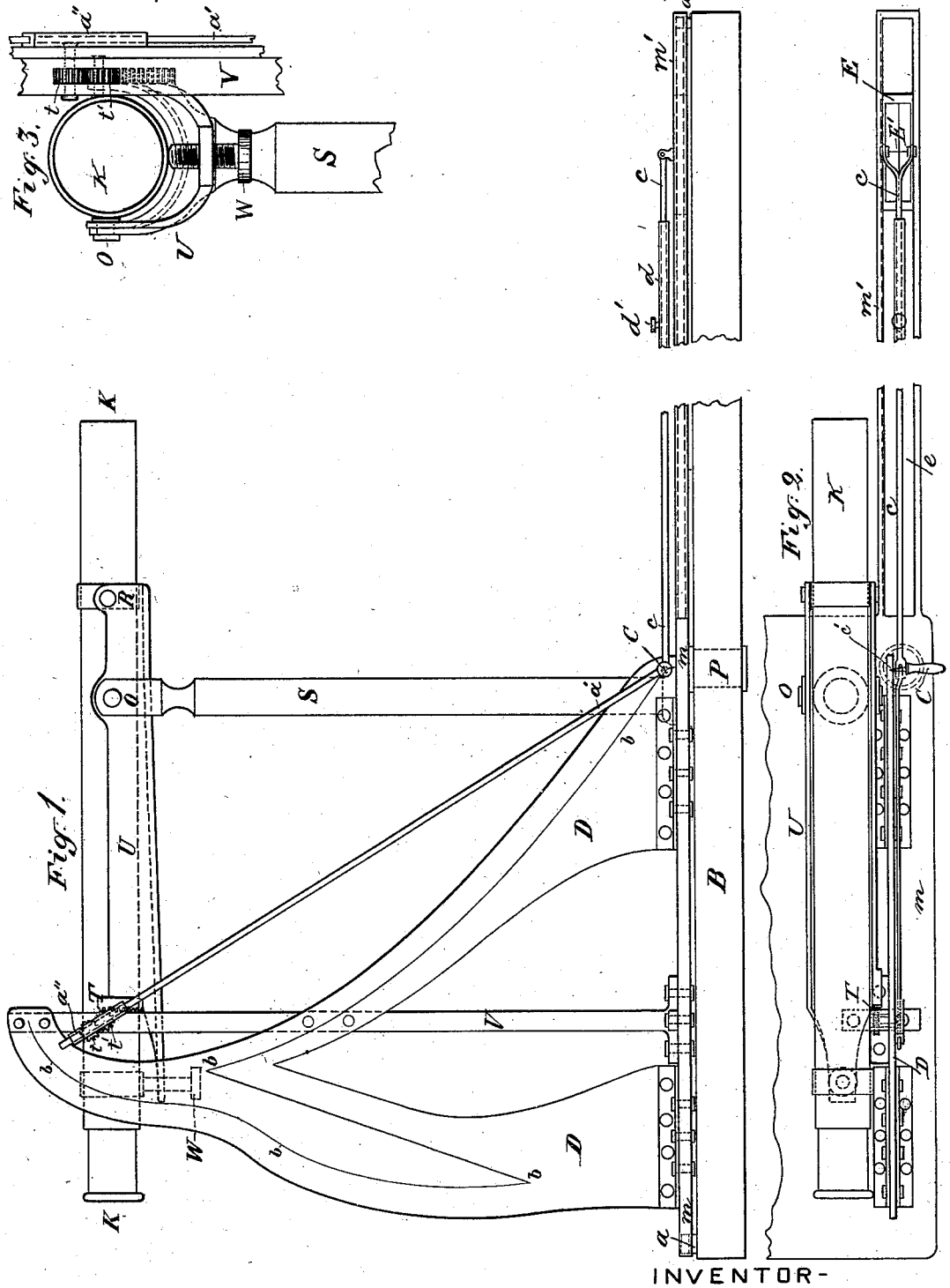

HANS GEORG JAKOB STANG, OF CHRISTIANIA, NORWAY.

OPTICAL RECORDING-INSTRUMENT.

SPECIFICATION forming part of Letters Patent No. 373,206, dated November 15, 1887.

Application filed April 14, 1887. Serial No. 234,751. (No model.) Patented in Sweden April 17, 1886, No. 654; in Norway April 21, 1886, No. 87; in France April 24, 1886, No. 175,739; in Germany April 28, 1886, No. 37,912; in England May 3, 1886, No. 5,996, and in Italy June 30, 1886, No. 244.

*To all whom it may concern:*

Be it known that I, HANS GEORG JAKOB STANG, a citizen of the Kingdom of Norway, and a resident of Christiania, Norway, have invented an Improved Instrument Styled an Orograph, (for which patents have been granted in Sweden, April 17, 1886, No. 654; in Norway, April 21, 1886, No. 87; in France, April 24, 1886, No. 175,739; in Germany, April 28, 1886, No. 37,912; in England, May 3, 1886, No. 5,996, and in Italy, No. 244, June 30, 1886,) of which the following is a specification.

My invented relates to mathematical instruments of the character employed by engineers of the army and navy; and my object is to produce an optical recording-instrument, which will be hereinafter fully and carefully described.

The object of this instrument is to enable an engineer at a station, the height of which above an adjacent water-level is known, to transfer directly upon a map placed under the instrument the motion of an object on the water-surface, or, in general, to enable him to determine on the map a line upon the water. The instrument may thus be employed in the case of submarine mines or torpedo defenses by following from a station the motion of a vessel by means of the telescope, whereby a wire cross in the instrument will follow on the map, on which the positions of the mines are marked out, the route of the vessel and indicate its position. For measuring up coasts with the instrument, the telescope is directed along the configuration of the coast when a drawing-pen in the instrument traces it upon the map on the scale for which the instrument is adjusted.

Figure 1 in the annexed drawings shows the instrument in side elevation mounted on the table, upon which table the map is placed. Fig. 2 shows the instrument in plan. Fig. 3 shows the upper part of the instrument, on a larger scale, viewed from the ocular end of the telescope.

B is a table or board, upon which the map is placed in front of the instrument.

m is the platform of the instrument, which turns or swings on a vertical pivot, P, by means of which the whole instrument is secured to the table. At the ends of the platform m there are or may be small rollers a, in order that the instrument may be easily turned on the pivot P, but nevertheless remain steady. On the platform m an upright standard, S, is secured, supporting a gutter, U, pivoted at O. The telescope K is secured at the forward part of the gutter by means of a pivot, R. At the ocular end of the telescope, in the gutter, is a screw, W, supporting it. On the platform m are also secured a guide-plate, D, and a bar, V, staying the former and supporting in bearings the shafts of two pinions, t t', gearing with one another. The lower one of these pinions, t', gears also with a toothed arc or curved rack, T, secured to the gutter U.

In the fore part, m', of the platform m, which extends forward of pivot P, there is a slide-way, e, in which a slide, E, is mounted and plays. This slide has a comparatively large opening in it, across which a wire cross, E', extends. The slide E is coupled to a link-bar, c, by means of a joint, and the link-bar is connected in the same manner with a bar, a', traversing and movable through a sleeve, a'', secured to the shaft of pinion t.

In the guide-plate D is a narrow groove, b b b b, (which may be more or less deep,) and in the axis of the joint, where the bars c and a' are coupled together, is fixed a pin, c', the tip of which engages the groove b b, and said pin has a handle, C, whereby it may be conveniently caused to follow the groove b b.

The screw W should be provided with some sort of division or scale whereby the telescope K may be accurately adjusted with respect to gutter U. The bar c is made extensible, so that it can be shortened or prolonged, by means of a sleeve, d, and set-screw d', whereby the wire cross E' may be adjusted with respect to the starting-point of the groove b b above the pivot P.

The construction of the instrument being now described, it is easy to understand its working. When the instrument has been mounted, the rear part of the same is grasped with one hand in order to turn the instrument horizontally. The handle C is grasped with the other hand and manipulated so that the point c' will follow groove b b. The bar a' being swung in this manner it rotates or partially turns the pinion t, thus turning the pinion t', which meshes with the toothed rack T. By this means the inclination of the telescope K is changed or varied, and in turning the instrument horizontally and following groove b b with the handle C the motion of an object on the water may be followed by means of the telescope. As may be seen, owing to the construction of the instrument, the wire cross E', moving simultaneously with the telescope, will both pivot on the pivot P and approach or recede from the same. The table B of the instrument is adjusted to stand level or horizontal, and the map is placed in front of the instrument, so that the situation on the map of the place of observation coincides with the pivot P of the instrument, and so that the points on the map correspond with the real ones—that is to say, the map is orientated like a plane-table. When an object moving upon the water is followed by the telescope, the motion of the telescope will ordinarily partake both of a horizontal and vertical motion.

By the above it will be perceived that the longitudinal wire of the wire cross E' of slide E, when following the object with the telescope, will always be placed on the map in the same direction as the object. The motion of the telescope in a vertical direction is determined by the increase or decrease of the distance of the object in such a manner that a given distance corresponds with a certain angle which the axis of the telescope makes with a vertical line. When the pin c', as indicated on the drawings, stands at the lower point of the groove b b, the wire cross E' will occupy its most distant position on the map, and the telescope must then make a corresponding angle with the vertical line. This starting position will vary with the height of the instrument above the water-level, wherefore the instrument must previous to use be carefully adjusted by means of the screw W and by regulating the length of the bar c. The curvature or form of the groove b b also varies with the height of the instrument above the water-level at the time the observation is taken, and plates having grooves of different forms and suited to these varying heights of the instrument may be employed, such plates being adapted for attachment to and removal from plate D; but it is possible by adjusting the parts of the instrument to cause three points of the curves of the different grooves to coincide, and as the shape of the grooves is not varied very much there is no need to substitute grooves of different forms unless the water-level has sunk or risen at least one meter.

The rectilinear part of the groove b b passes, as may be seen, if prolonged, through the shaft of pinion t'. Thus the telescope will not change position if the pin c' in the terminal point of bar a' be moved from one end to the other of this rectilinear part of the groove. Likewise the position of the wire cross E' will be the same if the pin c' be at the upper or lower part of the said rectilinear part of the groove.

If the instrument is to be used for coast-measuring, there is generally no fixed point to depart from. Therefore the telescope must first be adjusted for a height of "nil" meters by means of screw W. The optical axis is then adjusted horizontally by means of a liquid level on the telescope. Then such positions are given to the bar c and to the telescope as are suited to the real height of the instrument, after which it is ready for use.

I have represented the groove b b b merely by a single line in Fig. 1, as that will suffice to show its form. The front portion, m', of the base m, which has the slideway e formed in it, may be narrow, as shown in Fig. 2. The curve of the rack T will be drawn from O as a center. The map over which the wire cross E' plays may be, for example, a map, on a small scale, of a harbor overlooked from the station at which the instrument is placed, and the exact position of submarine mines or torpedoes in the harbor may be accurately laid down on this map. Now, if the instrument be properly set and its parts properly adjusted, when the telescope is directed at the spot on the water-level where a torpedo is sunk, the wire cross E' will stand over the spot on the map indicating the position of said torpedo; and if the telescope be kept constantly directed at a moving vessel in the water the wire cross E' will follow the track of said vessel on the map. Any form of indicator may be substituted for the wire cross E'—as a pencil, for example—which will trace the vessel's course on the map.

As in constructing the instrument it is important to know what form and curvature to give to the groove b b, I will now explain how this may be done. The proper form of this groove b may be determined mathematically; but it will suffice, and be preferable, to explain how its form may be determined practically. In the first place, when placed at a given height above the water-level, there will be a maximum distance from the observing-point for which the instrument can be used, and we may, for illustration, assume this to be three thousand meters. Floating objects, as boats, are now anchored in a straight line, the first at three thousand meters distant, the second at two thousand nine hundred meters distant, the third two thousand eight hundred meters distant, and so on, the objects being one hundred meters apart. The positions of these several objects will also be noted on the map in front of the instrument. Now direct the telescope at the first and most distant object and set the wire cross E' to the point on the map representing that object, the bar c being placed in a horizontal position. Pin $c'$ will now stand at the lower end of the groove $b$, or at the initial starting-point of said groove, as seen in Fig. 1. This initial point of the groove is constant for all forms of grooves. Note or mark this initial point on plate D, or on a plate secured thereto. Next swing back bar $a'$ until the telescope is sufficiently depressed to bear on the second object, two thousand nine hundred meters distant, and slide bar $a'$ upward through sleeve $a''$, thus drawing back bar $c$ and wire cross $E'$ until the latter coincides with the point on the map which corresponds to the said second anchored object. Pin $c'$ will now stand at a point in groove $b$, which may be noted. Thus two points in the groove $b$ will have been determined, and the remaining points may be determined in precisely the same manner. After the determination of the several points a line may be traced through them, which will determine the form of the groove and its position on plate D.

In lieu of actually anchoring objects in the water, it will be obvious to the experienced engineer that, knowing the elevation of his instrument above the water-level and the distances, he can, by using a vertical limb or arc, depress the telescope to the proper angles—that is to say, he may readily ascertain by calculation the degree of depression required to cause the telescope to bear on an object placed at a given distance away on the water. Of course the distances and spacing of the anchored objects here given are purely arbitrary.

Having thus described my invention, I claim—

1. An instrument for determining upon a map the course of an object upon a horizontal surface, as a vessel on the water, consisting of a telescope pivotally mounted on a horizontal axis in a support mounted on a vertical axis, a slideway attached to said support and having its axis parallel with that of the telescope, an indicator mounted in said slideway, a bar, $c$, coupled at one end to said indicator, and its other end to a bar, $a'$, gearing, substantially as described, whereby the lateral vibration of bar $a'$ is caused to impart motion to the telescope on its pivotal axis, a vertically-arranged plate having a groove, $b$, of the character described, and a pin, $c'$, at the point where the bars $a'$ and $c$ are coupled together, said pin engaging said groove $b$, substantially as set forth.

2. In an orograph instrument, the combination, with a table, B, of the base $m$, pivotally mounted thereon at P, and provided with a guideway, $e$, the holder or gutter U, pivotally mounted on base $m$, the telescope, pivotally mounted in said gutter and provided with an adjusting-screw, W, the curved rack T on the gutter, the intermeshing pinions $t$ and $t'$, rotatively mounted in a support on base $m$, and pinion $t'$ in mesh with rack T, the cross sleeve or guide $a''$, secured to the shaft of pinion $t$, the bar $a'$, mounted in sleeve $a''$ and capable of sliding therein, the bar $c$, coupled at one end to bar $a'$ and at the other end to a slide, E, the said slide E mounted in slideway $e$, and provided with an indicator or wire cross, $E'$, the guide-plate D, with a groove, $b\ b$, the handle C at the coupling of bars $a'$ and $c$, and the pin $c'$, engaging the groove $b\ b$, all arranged to operate substantially as set forth.

3. An instrument for ascertaining cartographically the course of an object moving on a horizontal plane, consisting of a base-plate, $m$, mounted on a vertical axis and provided with a slideway projecting out over a map of the said plane surface, a slide bearing an indicator mounted in said slideway, a telescope pivotally mounted on a horizontal axis on a plate, $m$, a vertical guide-plate, D, and bars $a'$ $c$, jointed together and connecting the telescope with said indicator-slide, said bars being guided in such a manner that the indicator will follow on the map the course of an object seen through and followed by the telescope.

In testimony whereof I affix my signature in presence of two witnesses.

HANS GEORG JAKOB STANG.

Witnesses:
  JOHAN LANGE,
  EUG. SISSENÈRE.